US012764564B2

(12) United States Patent
Fan

(10) Patent No.: US 12,764,564 B2
(45) Date of Patent: Oct. 13, 2026

(54) CONTROL METHOD AND TERMINAL DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 305 days.

(21) Appl. No.: 18/531,253

(22) Filed: Dec. 6, 2023

(65) Prior Publication Data

US 2024/0114360 A1 Apr. 4, 2024

Related U.S. Application Data

(63) Continuation of application No. PCT/CN2021/099340, filed on Jun. 10, 2021.

(51) Int. Cl.
*H04W 24/02* (2009.01)
*H04W 16/18* (2009.01)
(Continued)

(52) U.S. Cl.
CPC .......... *H04W 24/02* (2013.01); *H04W 16/18* (2013.01); *H04W 24/10* (2013.01); *H04W 74/0833* (2013.01)

(58) Field of Classification Search
CPC ..... H04W 24/02; H04W 16/18; H04W 24/10; H04W 74/0833; H04W 8/24;
(Continued)

(56) References Cited

U.S. PATENT DOCUMENTS

2015/0141013 A1* 5/2015 Cui .................... H04W 48/20 455/436
2020/0366326 A1 11/2020 Jassal et al.
(Continued)

FOREIGN PATENT DOCUMENTS

CN 108924910 11/2018
CN 111919460 11/2020
(Continued)

OTHER PUBLICATIONS

EPO, Extended European Search Report for EP Application No. 21944578.0, Jun. 14, 2024.
(Continued)

*Primary Examiner* — Kibrom T Hailu
(74) *Attorney, Agent, or Firm* — Hodgson Russ LLP

(57) ABSTRACT

A control method and a terminal device are provided. The method includes the following. A first terminal device receives artificial intelligence (AI) control information from a network device or a second terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

19 Claims, 5 Drawing Sheets

(51) Int. Cl.
*H04W 24/10* (2009.01)
*H04W 74/0833* (2024.01)

(58) Field of Classification Search
CPC ........ H04W 24/00; H04L 41/16; H04L 43/16; H04L 41/0813; G06N 3/00; G06N 3/045; G06N 20/00
See application file for complete search history.

(56) References Cited

U.S. PATENT DOCUMENTS

| | | | | |
|---|---|---|---|---|
| 2021/0160149 | A1* | 5/2021 | Ma | H04L 1/0041 |
| 2021/0168684 | A1* | 6/2021 | Kang | H04W 36/22 |
| 2021/0345244 | A1* | 11/2021 | Raghavan | H04W 76/28 |
| 2022/0351218 | A1* | 11/2022 | Karri | G06N 20/00 |
| 2023/0115368 | A1* | 4/2023 | Parichehrehteroujeni | H04W 74/0833 706/46 |
| 2024/0080884 | A1* | 3/2024 | Ma | H04W 74/002 |

FOREIGN PATENT DOCUMENTS

| | | |
|---|---|---|
| WO | 2020080989 | 4/2020 |
| WO | 2020234507 | 11/2020 |
| WO | 2021063500 | 4/2021 |

OTHER PUBLICATIONS

"3rd Generation Partnership Project; Technical Specification Group Radio Access Network; NR; Radio Resource Control (RRC) protocol specification (Release 16)," 3GPP TS 38.331, Mar. 2021, v16.4.1.

Ericsson, "AI/ML based Use Cases," 3GPP TSG-RAN WG3 Meeting #110-e, R3-206437, Nov. 2020.

Zte et al., "Solution to AI based UE Trajectory prediction," 3GPP TSG-RAN WG3 #112-e, R3-212029, May 2021.

WIPO, International Search Report and Written Opinion for International Application No. PCT/CN2021/099340, Mar. 9, 2022.

* cited by examiner

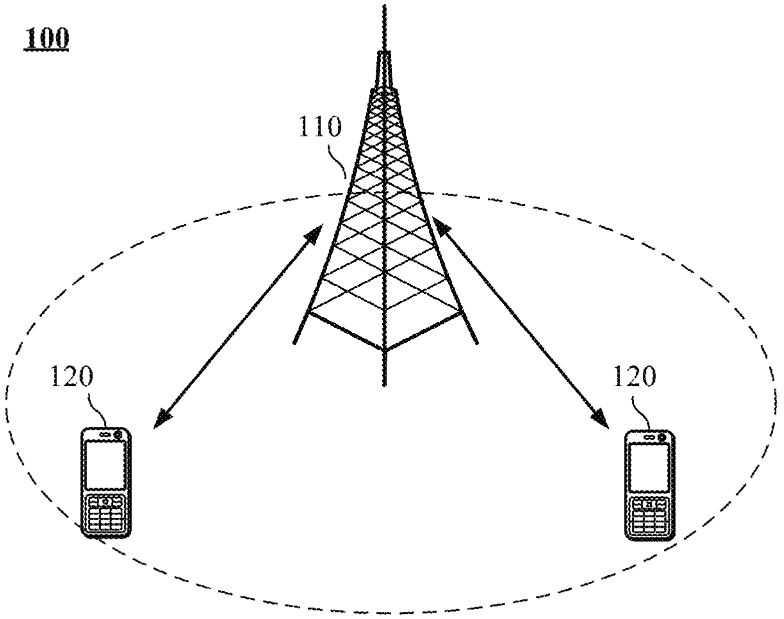

FIG. 1

200

FIRST TERMINAL DEVICE RECEIVES AI CONTROL INFORMATION FROM NETWORK DEVICE OR SECOND TERMINAL DEVICE, WHERE AI CONTROL INFORMATION INCLUDES AT LEAST ONE OF: AI ALGORITHM INFORMATION, APPLICATION-SCENARIO IDENTITY INFORMATION, OPTIMIZATION GOAL INFORMATION, AI ALGORITHM INPUT-DATA-TYPE INFORMATION, AI ALGORITHM OUTPUT-DATA-TYPE INFORMATION, CONFIGURATION INFORMATION OF TRIGGERING EVENT FOR AI-RELATED DATA FEEDBACK, OR FORMAT REQUIREMENT FOR AI-RELATED DATA FEEDBACK

S210

FIG. 2

CONTROL METHOD AND TERMINAL DEVICE

CROSS-REFERENCE TO RELATED APPLICATION(S)

This application is a continuation of International Application No. PCT/CN2021/099340, filed Jun. 10, 2021, the entire disclosure of which is incorporated herein by reference.

TECHNICAL FIELD

This disclosure relates to the field of communication, and more specifically to a control method and a network device.

BACKGROUND

During communication, a terminal device takes into consideration a limited number of input parameters, but can know parameter types that are far more than the parameters considered. In general, considering the overall impact of various parameters is beneficial for the terminal device to make more effective decisions, such as reducing energy consumption of a user equipment (UE) and reducing user latency. However, an existing protocol architecture does not support the use of the additional parameters by the terminal device, which is unfavorable to further improving performance of the terminal device.

SUMMARY

A control method is proposed in embodiments of the disclosure. The method includes the following. A first terminal device receives artificial intelligence (AI) control information from a network device or a second terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

A control method is further proposed in embodiments of the disclosure. The method includes the following. A network device sends AI control information to a first terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

A terminal device is further proposed in embodiments of the disclosure. The terminal device includes a processor, a memory, and a transceiver. The memory is configured to store a computer program, and the processor is configured to invoke and execute the computer program stored in the memory to control the transceiver to perform the method of any one of the foregoing embodiments.

BRIEF DESCRIPTION OF THE DRAWINGS

FIG. 1 is a schematic diagram illustrating an application scenario of embodiments of the disclosure.

FIG. 2 is a schematic flowchart of a control method 200 according to embodiments of the disclosure.

DETAILED DESCRIPTION

Figure 3:
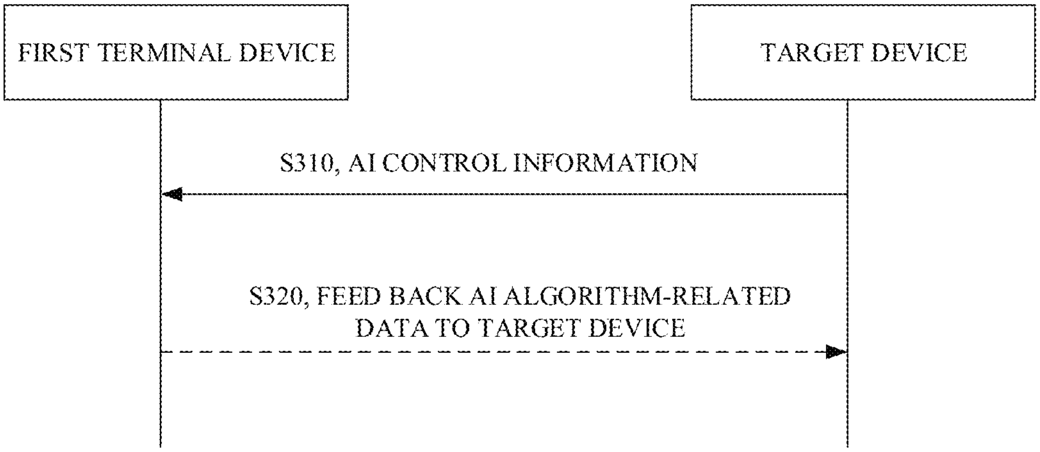
FIG. 3 is a flowchart of an overall idea of a control method according to embodiments of the disclosure.

The following will describe technical solutions of embodiments of the disclosure with reference to the accompanying drawings in embodiments of the disclosure.

It is to be noted that, the terms “first”, “second”, and the like used in the specification, the claims, and the accompany drawings of embodiments of the disclosure are used to distinguish similar objects rather than describe a particular order or a precedence order. In addition, the terms “first” and “second” may describe same or different objects.

Technical solutions of embodiments of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (Wi-Fi), a $5^{th}$ generation (5G) system, or other communication systems.

Generally speaking, a conventional communication system supports a limited quantity of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication, and the like. Embodiments of the disclosure can also be applied to these communication systems.

Optionally, a communication system in embodiments of the disclosure may be applied to a carrier aggregation (CA) scenario, a dual connectivity (DC) scenario, or a standalone (SA) network deployment scenario.

There is no limitation on the spectrum where embodiments of the disclosure are applied. For example, embodiments of the disclosure may be applied to a licensed spectrum, or may be applied to an unlicensed spectrum.

Various embodiments of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, and the like. The terminal device may be a station (ST) in a WLAN, a cellular radio telephone, a cordless telephone, a session initiation protocol (SIP) telephone, a wireless local loop (WLL) station, a personal digital assistant (PDA), a handheld device, a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), and the like.

By way of explanation rather than limitation, in embodiments of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

The network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or an AP, or an in-vehicle device, a wearable device, a network device in an NR network (gNB), or a network device in a future evolved PLMN, and the like.

In embodiments of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell herein may include: a metro cell, a micro cell, a pico cell, a femto cell, and the like. These small cells are characterized by small coverage and low transmission power and are adapted to provide data transmission service with high-rate.

FIG. 1 exemplarily illustrates one network device 110 and two terminal devices 120. Optionally, a wireless communication system 100 may include multiple network devices 110, and there can be other quantities of terminal devices 120 in a coverage area of each of the network devices 110. Embodiments of the disclosure are not limited in this regard. Embodiments of the disclosure may be applied to one terminal device 120 and one network device 110, or may also be applied to one terminal device 120 and another terminal device 120.

Optionally, the wireless communication system 100 may further include other network entities such as a mobility management entity (MME), an access and mobility management function (AMF), or the like, and embodiments of the disclosure are not limited in this regard.

It may be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It may be understood that, "indication" referred to in embodiments of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of embodiments of the disclosure, the term "correspondence" may mean that there is a direct or indirect correspondence between the two, may mean that there is an association between the two, or may mean a relationship of indicating and indicated or configuring and configured, or the like.

For better understanding of technical solutions of embodiments of the disclosure, the related art will be elaborated first. The related art below, as an optional scheme, can be arbitrarily combined with the technical solutions of embodiments of the disclosure, which shall all belong to the protection scope of embodiments of the disclosure.

There are various data in life, such as navigation data, shopping data, health data, and communication data. Single data cannot reflect a characteristic of an object, but a large amount of data can reflect some potential characteristics or properties of the object to a certain extent, thereby bringing guiding input for technical improvement. Artificial intelligence (AI) technology is one of the cutting-edge technologies based on big data. AI algorithms can be designed to realize intelligentization in various scenarios, for example, AI-controlled smart home systems, AI-based navigation systems, and the like. AI technology needs to be used in combination with characteristics of an application scenario, so as to achieve optimization effect which is more adaptive to the scenario.

During communication of a terminal device, for example, during random access or during cell re-selection, the terminal device takes into consideration a limited number of input parameters, and the input parameter that the terminal device usually takes into consideration includes a measurement result of a cell signal. But the terminal device can know parameter types that are far more than the measurement result of the cell signal. In general, considering the overall impact of various parameters is beneficial for the terminal device to make more effective decisions, such as reducing energy consumption of the UE and reducing user latency. However, an existing protocol architecture does not support the use of the additional parameters by the terminal device, which is unfavorable to further improving performance of the terminal device.

A control method is proposed in embodiments of the disclosure. FIG. 2 is a schematic flowchart of a control method 200 according to embodiments of the disclosure. Optionally, the method is applicable to the system illustrated in FIG. 1, but is not limited thereto. The method includes at least part of the following.

S210, a first terminal device receives AI control information from a network device or a second terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

The network device above may include an access-network device or a core-network device.

The AI-related data above may include at least one of: AI algorithm input data; AI algorithm output data; or AI algorithm intermediate data.

By receiving the AI control information in the above method, the first terminal device can make flexible use of multiple input parameters, which breaks through constraint of a conventional protocol on fixed inputs, and therefore different optimization goals can be achieved in an intelligentized analysis mode. The AI control information received by the first terminal device can be used for communication, such as random access or cell selection/re-selection, which can improve the performance of the terminal device during random access or cell selection/re-selection.

FIG. 3 is a flowchart of an overall idea of a control method according to embodiments of the disclosure. The method includes the following.

S310, a first terminal device receives AI control information from a target device, where the target device may be a network device or a second terminal device. For contents of the AI control information, reference can be made to the foregoing embodiments.

Optionally, the method may further include the following.

S320, the first terminal device feeds back AI-related data to the target device, where the AI-related data includes at least one of AI algorithm input data, AI algorithm output data, or AI algorithm intermediate data.

AI-related data feedback may be triggered based on a preset event. The preset event may be explicitly configured by the target device, or may be pre-defined in a protocol.

In some embodiments, an AI algorithm indicated by the AI algorithm information in the AI control information above may contain a data input module, a data output module, and the like.

In some embodiments, the application-scenario identity information in the AI control information above can identify an AI algorithm-specific application scenario. An application scenario indicated by the application-scenario identity information may include at least one of: a random-access scenario, a cell selection/re-selection scenario, a network-selection scenario, a cell-measurement scenario, a paging scenario, or a handover scenario. The cell selection/re-selection scenario may also be referred to as a cell-search scenario. The network-selection scenario includes a public-network selection scenario and a non-public network (NPN) selection scenario. The cell-measurement scenario includes at least one of a cell-measurement start-up scenario, a cell-measurement execution scenario, or a cell-measurement result reporting scenario.

In some embodiments, the optimization goal information in the AI control information above indicates an optimization goal of an AI algorithm. An optimization goal indicated by the optimization goal information includes at least one of: energy saving, latency reduction, data throughput enhancement, data bit error rate (BER) reduction, quality of service (QoS) level improvement, or service continuity enhancement.

Specifically, energy saving includes energy saving at a terminal device and/or energy saving at a network device.

Specifically, latency reduction may include at least one of: access latency reduction, service interruption latency reduction, service terminal-to-terminal latency reduction, or data processing latency reduction. Latency may refer to average latency, or minimum latency, or maximum latency, and the disclosure is not limited in this regard.

Specifically, data throughput may be average throughput or peak throughput.

In some embodiments, the format requirement for AI-related data feedback above can be used to define a format for AI-related data feedback. The format requirement for AI-related data feedback includes a type requirement for data that needs to be fed back and/or a type-accuracy requirement for data that needs to be fed back.

Specifically, the type requirement for data that needs to be fed back contains at least one type of data that needs to be fed back.

For the AI algorithm input-data-type information and the AI algorithm output-data-type information in the AI control information, the contents included vary with different application scenarios. The following will give a detailed description.

Scenario 1: Random-Access Scenario (1) AI Algorithm Input-Data-Type Information

If the application-scenario identity information in the AI control information above indicates the random-access scenario, a data type indicated by the AI algorithm input-data-type information includes at least one of: geographical location information of the first terminal device; a measurement result of a serving cell; a measurement result of at least one neighboring cell; an evaluation result of a random access channel (RACH) busy ratio; an evaluation result of channel interference; or an RACH history report.

The evaluation result of the RACH busy ratio can be used to evaluate the load of an RACH, so as to assist the first terminal device in determining whether to initiate a random access attempt. In general, a terminal device tends to initiate the random access attempt when the load of the RACH is lower.

The RACH history report above may include an RACH report obtained in a self-optimization network (SON) procedure. The RACH report may contain at least one of the following data: a cell identifier (ID) corresponding to a random access procedure, a cause for triggering the random access procedure, time-frequency resource configuration for the random access procedure, a log related to a four-step random access procedure, or a log related to a two-step random access procedure.

(2) AI Algorithm Output-Data-Type Information

If the application-scenario identity information above indicates the random-access scenario, a data type indicated by the AI algorithm output-data-type information may include at least one of: desired random-access configuration; an updated AI algorithm; a modification strategy for an AI algorithm input parameter; a modification strategy for an AI algorithm output parameter; or a selection strategy for random-access configuration.

For the same input parameter, different outputs may be obtained with different AI algorithms. In order to achieve better optimization goals, the terminal device or the network device may need to update the AI algorithm based on a historical calculation. For example, the updated AI algorithm above may include the order in which each input parameter is used in the AI algorithm, the weight ratio in which each parameter is used in the AI algorithm, and other factors. A good algorithm may have a mechanism for self-update based on an output property.

Optionally, the modification strategy for the AI algorithm input parameter above can be used to adjust an AI algorithm input parameter type. For example, some relatively useless input parameters can be removed, and some newly identified input parameters can be introduced.

The modification strategy for the AI algorithm output parameter above can be used to adjust an AI algorithm output parameter type. For example, some relatively useless output parameters can be removed.

In some embodiments, the updated AI algorithm, the modification strategy for the AI algorithm input parameter, and the modification strategy for the AI algorithm output parameter can be combined to achieve the update for the AI algorithm.

The selection strategy for random-access configuration above can be used for the first terminal device to select, according to the AI algorithm input data, target random-access configuration. The target random-access configuration may include at least one of: a location of an RACH occasion (RO) corresponding to the random-access attempt; a type of a random-access code corresponding to the random-access attempt; a level of random-access transmission power corresponding to the random-access attempt; or an ID of a target synchronization signal block (SSB)/physical broadcast channel block (PBCH block) corresponding to the random-access attempt or an ID of a channel state information-reference signal (CSI-RS) corresponding to the random-access attempt.

The desired random-access configuration above is similar to target random-access configuration information, which will not be repeated herein.

Scenario 2: Cell Selection/Re-Selection Scenario (1) AI Algorithm Input-Data-Type Information If the application-scenario identity information above indicates the cell selection/re-selection scenario, a data type indicated by the AI algorithm input-data-type information includes at least one of: information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on minimization of drive test (MDT); or cell deployment related information.

The information of the user-desired destination can assist the first terminal device in planning or predicting a mobile path.

The history data on cell selection/re-selection for the first terminal device above may contain ID information of a cell camped by the first terminal device historically and information of a duration of stay in the cell. The ID information of the cell may be a cell global identity (CGI) or combined information of frequency-point information and physical cell identity (PCI) information.

The log report above may include data recorded in logged MDT and/or immediate MDT.

The cell deployment related information above can provide basic information of a cell within a zone. The basic information includes at least one of: zone ID information; geographical coordinate information of each cell within the zone; frequency resource related information of each cell within the zone; PCI information of each cell within the zone; CGI information of each cell within the zone; coverage area information of each cell within the zone; history load information of each cell within the zone; a service type supported by each cell within the zone; or information of a slice type supported by each cell within the zone.

The cell deployment related information may be provided by the network device through common signaling and/or dedicated signaling. Alternatively, the cell deployment related information may be provided by the second terminal device through at least one of unicast signaling, multicast signaling, or broadcast signaling.

Specifically, common signaling may include a broadcast message or a paging message, and dedicated signaling may include an application-layer message, a non-access stratum (NAS) message, a radio resource control (RRC) message, a layer 2 (L2) control message, or a layer 1 (L1) control message.

(2) AI Algorithm Output-Data-Type Information

If the application-scenario identity information above indicates the cell selection/re-selection scenario, a data type indicated by the AI algorithm output-data-type information may include at least one of: information of a desired cell selection/re-selection path; an updated AI algorithm; a modification strategy for an AI algorithm input parameter; a modification strategy for an AI algorithm output parameter; or decision-making information for target cell determination during cell selection/re-selection.

Optionally, the information of the desired cell selection/re-selection path can be used to assist the first terminal device in selecting an optimal re-selection path. After a destination is determined, the AI algorithm can plan, according to the cell deployment related information, for the first terminal device a path that is less time-consuming and power-consuming or a path that facilitates initiating a preferred service, thereby optimizing user experience.

The updated AI algorithm, the modification strategy for the AI algorithm input parameter, and the modification strategy for the AI algorithm output parameter correspond to the contents of Scenario 1, respectively, which will not be repeated herein.

The decision-making information for target cell determination during cell selection/re-selection can be used for the first terminal device to obtain, according to the AI algorithm input data, characteristic information of a target cell. The characteristic information of the target cell includes at least one of: CGI information corresponding to the target cell; frequency related information of the target cell; or PCI information of the target cell.

It is to be noted that, the measurement result of the serving cell above or the measurement result of the at least one neighboring cell above may be a cell-level measurement result or a beam-level measurement result. A base measurement quantity may be at least one of reference signal received power (RSRP), reference signal received quality (RSRQ), or signal to interference plus noise ratio (SINR).

At S320, a trigger mechanism for the first terminal device to feed back the AI-related data may include the following at least two cases.

Case 1, Triggered by a Pre-Defined Event

The above AI control information received by the first terminal device may include configuration information of a triggering event for AI-related data feedback. For example, the configuration information of the triggering event for AI-related data feedback includes event type information and/or configuration information associated with the event. The event is used to trigger the first terminal device to feed back the AI-related data to the network device or the second terminal device. In case of occurrence of an event configured via the configuration information of the triggering event for AI-related data feedback, the first terminal device feeds back the AI-related data to the network device or the second terminal device.

When only one event is defined, the event type information may be absent. In this case, it is feasible to merely configure the configuration information associated with the event, for example, configure information such as a threshold, a timer, and the like.

When multiple events are defined, the network device or the second terminal device needs to select an event to configure for the first terminal device. In this case, the event type information needs to be configured. In addition, the configuration information associated with the event may also be present, if configuration details of the event further need to be configured.

An event type indicated by the event type information above may include at least one of the following.

Event 1: expiry of a data-feedback timer (for example, referred to as T1).

Event 2: arrival of data-feedback absolute time (for example, referred to as T).

Event 3: expiry of a periodical data-feedback timer (for example, referred to as T2).

Event 4: memory occupied by AI-related data stored in the first terminal device exceeds a first threshold.

Event 5: a measurement result of a serving cell signal is greater than or equal to a second threshold.

Event 6: the measurement result of the serving cell signal is greater than or equal to a third threshold, and a duration for which the measurement result of the serving cell signal is greater than or equal to the third threshold reaches a first duration.

Each of Event 1 to Event 4 and Event 5 or each of Event 1 to Event 4 and Event 6 can be used as a combined event. The combined event is triggered when any single event in the combined event is triggered.

In addition, the data-feedback timer T1, the data-feedback absolute time T, the periodical data-feedback timer T2, the first threshold, the second threshold, the third threshold, or the first duration is configured in at least one of the following manners: a system broadcast message; dedicated signaling; or a default value.

Case 2, Triggered by Immediate Signaling or by an Internal Event of the First Terminal Device The first terminal device feeds back the AI-related data to the network device or the second terminal device, if triggered by the preset event. The preset event includes at least one of the following.

Event 1: reception of first indication information from the network device, where the first indication information is used to request the first terminal device to feed back the AI-related data to the network device.

Event 2: reception of second indication information from the second terminal device, where the second indication information is used to request the first terminal device to feed back the AI-related data to the second terminal device.

Event 3: the first terminal device determines that an AI algorithm needs to be updated.

Event 4: the first terminal device determines that an AI algorithm input parameter strategy needs to be modified.

Event 5: the first terminal device determines that an AI algorithm output parameter strategy needs to be modified.

Event 6: a measurement result of a serving cell signal is greater than or equal to a fourth threshold.

Event 7: the measurement result of the serving cell signal is greater than or equal to a fifth threshold, and a duration for which the measurement result of the serving cell signal is greater than or equal to the fifth threshold reaches a second duration.

Each of Event 1 to Event 5 and Event 6 or each of Event 1 to Event 5 and Event 7 can be used as a combined event. The combined event is triggered when any single event in the combined event is triggered.

In addition, the fourth threshold, the fifth threshold, or the second duration can be configured in at least one of the following manners: a system broadcast message; dedicated signaling; or a default value.

Figure 4:
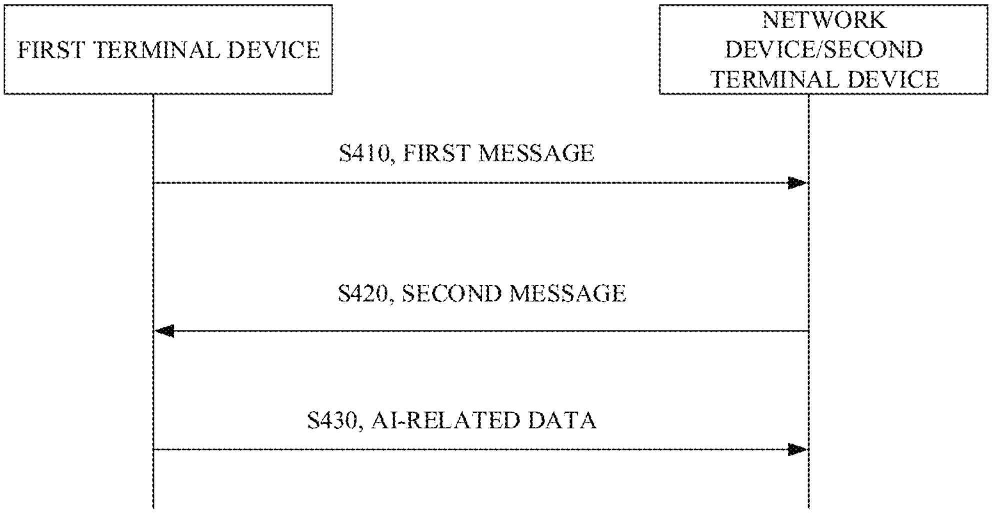
FIG. 4 is a flowchart for implementation of a control method 400 according to embodiments of the disclosure.

An AI-related data feedback mechanism is further disclosed in the disclosure. FIG. 4 is a flowchart for implementation of a control method 400 according to embodiments of the disclosure, which illustrates relevant operations for the first terminal device to feed back the AI-related data. The method 400 includes the following.

S410, a first terminal device sends a first message to a network device or a second terminal device, where the first message indicates that the network device or the second terminal device is to extract the AI-related data.

As illustrated in FIG. 4, the method 400 may further include the following.

S420, the first terminal device receives a second message from the network device or the second terminal device, where the second message is used to confirm that the AI-related data can be fed back.

As illustrated in FIG. 4, the method 400 may further include the following.

S430, the first terminal device feeds back the AI-related data to the network device or the second terminal device.

The feedback mechanism illustrated in FIG. 4 is merely an example, and other methods may further be adopted in the disclosure. For example, after operations at S410 and S420, the first terminal device does not feed back the AI-related data immediately, but feeds back the AI-related data to the network device or the second terminal device upon being triggered by the trigger mechanism above. For another example, after operations at S410 and S420, the first terminal device can feed back the AI-related data multiple times.

In some embodiments, before the first terminal device feeds back to the AI-related data to the network device or the second terminal device, the method 400 may further include the following. Establish an AI data transmission safety mechanism, and activate the AI data transmission safety mechanism.

The AI data transmission safety mechanism can be established and activated in the following at least two modes.

Mode 1, before receiving the AI control information, the first terminal device first establishes the AI data transmission safety mechanism with the network device or the second terminal device. The first terminal device can interact AI data only after the AI data transmission safety mechanism is activated.

Mode 2, it is not required to establish the AI data transmission safety mechanism prior to reception of the AI control information. However, the first terminal device is required to first establish and activate the AI data transmission safety mechanism, if the first terminal device needs to feed back the AI-related data. That is, the AI-related data can be sent only when the AI data transmission safety mechanism is established and activated.

In addition, in embodiments of the disclosure, the first terminal device and the network device can send capability indication to each other. Alternatively, the first terminal device and the second terminal device can send capability indication to each other.

For example, the first terminal device receives third indication information from the network device, where the third indication information indicates whether a current network supports an AI function.

The third indication information is carried in at least one of: a common signaling message; a dedicated signaling message; or an NAS message.

Specifically, common signaling includes a broadcast message or a paging message, and dedicated signaling includes an application-layer message, an RRC message, an L2 control message, or an L1 control message.

For another example, the first terminal device sends first capability indication information to the network device, where the first capability indication information is used to inform the network device whether the first terminal device supports an AI function.

For another example, the first terminal device interacts second capability indication information with the second terminal device, where the second capability indication information is used to inform the second terminal device whether the first terminal device supports the AI function.

The above introduces an AI-based control method proposed in embodiments of the disclosure. In the method, the terminal device can make flexible use of multiple input parameters, which breaks through constraint of a conventional protocol on fixed inputs, and therefore different optimization goals can be achieved in an intelligentized analysis mode. For example, performance of the terminal device can be improved during random access or cell selection/re-selection.

Figure 5:
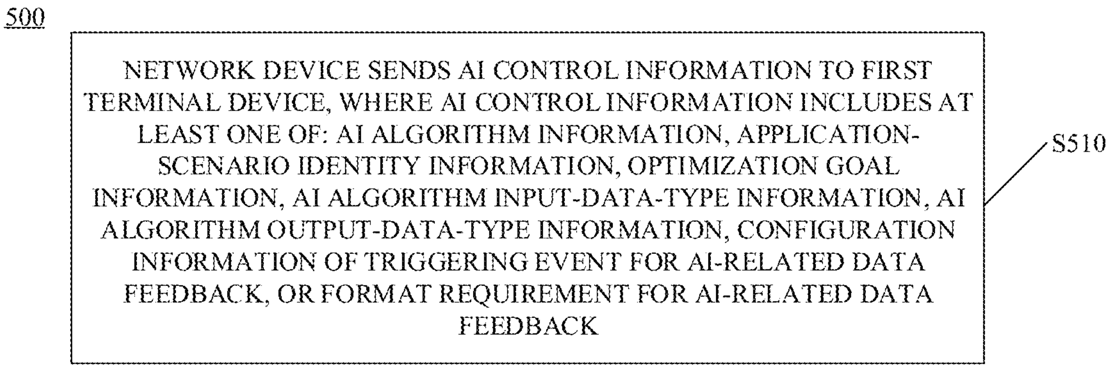
FIG. 5 is a schematic flowchart of a control method 500 according to embodiments of the disclosure.

A control method is further proposed in embodiments of the disclosure. FIG. 5 is a schematic flowchart of a control method 500 according to embodiments of the disclosure. Optionally, the method is applicable to the system illustrated in FIG. 1, but is not limited thereto. The method includes at least part of the following.

S510, a network device sends AI control information to a first terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

Optionally, an application scenario indicated by the application-scenario identity information above includes at least one of: a random-access scenario, a cell selection/re-selection scenario, a network-selection scenario, a cell-measurement scenario, a paging scenario, or a handover scenario.

The cell selection/re-selection scenario may also be referred to as a cell-search scenario. The network-selection scenario includes a public-network selection scenario and an NPN selection scenario. The cell-measurement scenario includes at least one of a cell-measurement start-up scenario, a cell-measurement execution scenario, or a cell-measurement result reporting scenario.

Optionally, an optimization goal indicated by the optimization goal information above includes at least one of: energy saving, latency reduction, data throughput enhancement, data BER reduction, QoS level improvement, or service continuity enhancement.

Specifically, energy saving includes energy saving at a terminal device and/or energy saving at a network device.

Specifically, latency reduction may include at least one of: access latency reduction, service interruption latency reduction, service terminal-to-terminal latency reduction, or data processing latency reduction. Latency may refer to average latency, or minimum latency, or maximum latency, and the disclosure is not limited in this regard.

Specifically, data throughput may be average throughput or peak throughput.

Optionally, if the application-scenario identity information above indicates the random-access scenario, a data type indicated by the AI algorithm input-data-type information includes at least one of: geographical location information of the first terminal device; a measurement result of a serving cell; a measurement result of at least one neighboring cell; an evaluation result of an RACH busy ratio; an evaluation result of channel interference; or an RACH history report.

Optionally, if the application-scenario identity information above indicates the random-access scenario, a data type indicated by the AI algorithm output-data-type information may include at least one of: desired random-access configuration; an updated AI algorithm; a modification strategy for an AI algorithm input parameter; a modification strategy for an AI algorithm output parameter; or a selection strategy for random-access configuration.

Optionally, the selection strategy for random-access configuration above is used for the first terminal device to select, according to the AI algorithm input data, target random-access configuration. The target random-access configuration includes at least one of: a location of an RO corresponding to the random-access attempt; a type of a random-access code corresponding to the random-access attempt; a level of random-access transmission power corresponding to the random-access attempt; or an ID of a target SSB corresponding to the random-access attempt or an ID of a CSI-RS corresponding to the random-access attempt.

Optionally, if the application-scenario identity information above indicates the cell selection/re-selection scenario, a data type indicated by the AI algorithm input-data-type information includes at least one of: information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on MDT; or cell deployment related information.

Optionally, the cell deployment related information above can provide basic information of a cell within a zone. The basic information includes at least one of: zone ID information; geographical coordinate information of each cell within the zone; frequency resource related information of each cell within the zone; PCI information of each cell within the zone; CGI information of each cell within the zone; coverage area information of each cell within the zone; history load information of each cell within the zone; a service type supported by each cell within the zone; or information of a slice type supported by each cell within the zone.

Optionally, the cell deployment related information above may be provided by the network device through common signaling and/or dedicated signaling.

Specifically, common signaling may include a broadcast message or a paging message, and dedicated signaling may include an application-layer message, an NAS message, an RRC message, an L2 control message, or an L1 control message.

Optionally, if the application-scenario identity information above indicates the cell selection/re-selection scenario, a data type indicated by the AI algorithm output-data-type information may include at least one of: information of a desired cell selection/re-selection path; an updated AI algorithm; a modification strategy for an AI algorithm input parameter; a modification strategy for an AI algorithm output parameter; or decision-making information for target cell determination during cell selection/re-selection.

Optionally, the decision-making information for target cell determination above is used for the first terminal device to obtain, according to the AI algorithm input data, characteristic information of a target cell. The characteristic information of the target cell includes at least one of: CGI information corresponding to the target cell; frequency related information of the target cell; or PCI information of the target cell.

Optionally, the AI-related data above includes at least one of AI algorithm input data, AI algorithm output data, or AI algorithm intermediate data.

Optionally, the configuration information of the triggering event for AI-related data feedback above includes event type information and/or configuration information associated with the event, where the event is used to trigger the first terminal device to feed back the AI-related data to the network device.

Optionally, an event type indicated by the event type information above includes at least one of: expiry of a data-feedback timer; arrival of data-feedback absolute time; expiry of a periodical data-feedback timer; memory occupied by AI-related data stored in the first terminal device exceeds a first threshold; a measurement result of a serving cell signal is greater than or equal to a second threshold; or the measurement result of the serving cell signal is greater than or equal to a third threshold, and a duration for which the measurement result of the serving cell signal is greater than or equal to the third threshold reaches a first duration.

Optionally, the data-feedback timer, the data-feedback absolute time, the periodical data-feedback timer, the first threshold, the second threshold, the third threshold, or the first duration is configured in at least one of the following manners: a system broadcast message; dedicated signaling; or a default value.

Optionally, the network device receives the AI-related data from the first terminal device, if triggered by the preset event above. The preset event includes at least one of: first indication information is received by the first terminal device from the network device, where the first indication information is used to request the first terminal device to feed back the AI-related data to the network device; the first terminal device determines that an AI algorithm needs to be updated; the first terminal device determines that an AI algorithm input parameter strategy needs to be modified; the first terminal device determines that an AI algorithm output parameter strategy needs to be modified; a measurement result of a serving cell signal is greater than or equal to a fourth threshold; or the measurement result of the serving cell signal is greater than or equal to a fifth threshold, and a duration for which the measurement result of the serving cell signal is greater than or equal to the fifth threshold reaches a second duration.

Optionally, the fourth threshold, the fifth threshold, or the second duration is configured in at least one of the following manners: a system broadcast message; dedicated signaling; or a default value.

Optionally, the format requirement for AI-related data feedback includes a type requirement for data that needs to be fed back and/or a type-accuracy requirement for data that needs to be fed back.

Specifically, the type requirement for data that needs to be fed back contains at least one type of data that needs to be fed back.

Optionally, before receiving AI-related data fed back by the first terminal device, the method further includes the following. Receive a first message from the first terminal device, where the first message indicates that the network device is to extract the AI-related data.

Optionally, after receiving the first message, the method further includes the following. Send a second message to the first terminal device, where the second message is used to confirm that the AI-related data can be fed back.

Optionally, before receiving AI-related data fed back by the first terminal device, the method further includes the following. Establish an AI data transmission safety mechanism.

Optionally, the method above further includes the following. Send third indication information to the first terminal device, where the third indication information indicates whether a current network supports an AI function.

Optionally, the third indication information is carried in at least one of: a common signaling message; a dedicated signaling message; or an NAS message.

Optionally, the method above further includes the following. Receive first capability indication information from the first terminal device, where the first capability indication information is used to inform the network device whether the first terminal device supports an AI function.

Optionally, the network device above includes an access-network device or a core-network device.

Figure 6:
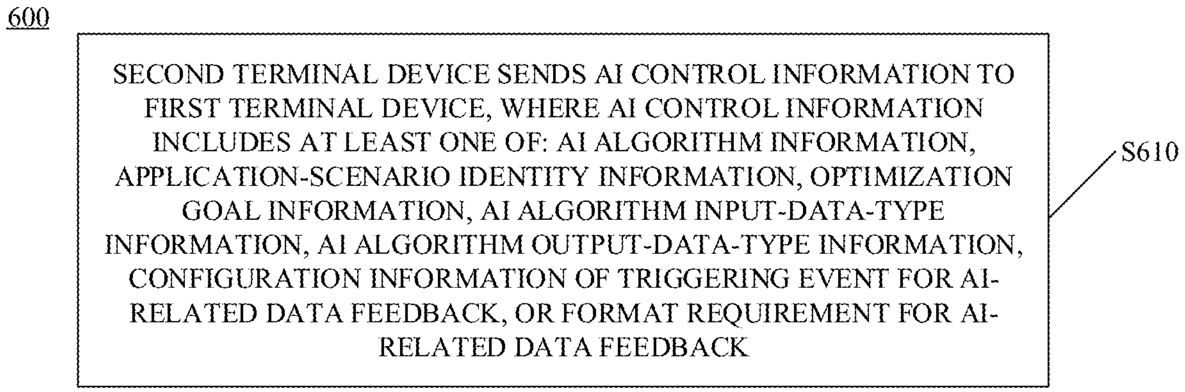
FIG. 6 is a schematic flowchart of a control method 600 according to embodiments of the disclosure.

A control method is further proposed in embodiments of the disclosure. FIG. 6 is a schematic flowchart of a control method 600 according to embodiments of the disclosure. Optionally, the method is applicable to the system illustrated in FIG. 1, but is not limited thereto. The method includes at least part of the following.

S610, a second terminal device sends AI control information to a first terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

Optionally, an application scenario indicated by the application-scenario identity information above includes at least one of: a random-access scenario, a cell selection/re-selection scenario, a network-selection scenario, a cell-measurement scenario, a paging scenario, or a handover scenario.

The cell selection/re-selection scenario may also be referred to as a cell-search scenario. The network-selection scenario includes a public-network selection scenario and an NPN selection scenario. The cell-measurement scenario includes at least one of a cell-measurement start-up scenario, a cell-measurement execution scenario, or a cell-measurement result reporting scenario.

Optionally, an optimization goal indicated by the optimization goal information above includes at least one of: energy saving, latency reduction, data throughput enhancement, data BER reduction, QoS level improvement, or service continuity enhancement.

Specifically, energy saving includes energy saving at a terminal device and/or energy saving at a network device.

Specifically, latency reduction may include at least one of: access latency reduction, service interruption latency reduction, service terminal-to-terminal latency reduction, or data processing latency reduction. Latency may refer to average latency, or minimum latency, or maximum latency, and the disclosure is not limited in this regard.

Specifically, data throughput may be average throughput or peak throughput.

Optionally, if the application-scenario identity information above indicates the random-access scenario, a data type indicated by the AI algorithm input-data-type information includes at least one of: geographical location information of the first terminal device; a measurement result of a serving cell; a measurement result of at least one neighboring cell; an evaluation result of an RACH busy ratio; an evaluation result of channel interference; or an RACH history report.

Optionally, if the application-scenario identity information above indicates the random-access scenario, a data type indicated by the AI algorithm output-data-type information may include at least one of: desired random-access configuration; an updated AI algorithm; a modification strategy for an AI algorithm input parameter; a modification strategy for an AI algorithm output parameter; or a selection strategy for random-access configuration.

Optionally, the selection strategy for random-access configuration above is used for the first terminal device to select, according to the AI algorithm input data, target random-access configuration. The target random-access configuration includes at least one of: a location of an RO corresponding to the random-access attempt; a type of a random-access code corresponding to the random-access attempt; a level of random-access transmission power corresponding to the random-access attempt; or an ID of a target SSB corresponding to the random-access attempt or an ID of a CSI-RS corresponding to the random-access attempt.

Optionally, if the application-scenario identity information above indicates the cell selection/re-selection scenario, a data type indicated by the AI algorithm input-data-type information includes at least one of: information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on MDT; or cell deployment related information.

Optionally, the cell deployment related information above can provide basic information of a cell within a zone. The basic information includes at least one of: zone ID information; geographical coordinate information of each cell within the zone; frequency resource related information of each cell within the zone; PCI information of each cell within the zone; CGI information of each cell within the zone; coverage area information of each cell within the zone; history load information of each cell within the zone; a service type supported by each cell within the zone; or information of a slice type supported by each cell within the zone.

Optionally, the cell deployment related information may be provided by the second terminal device through at least one of unicast signaling, multicast signaling, or broadcast signaling.

Optionally, if the application-scenario identity information above indicates the cell selection/re-selection scenario, a data type indicated by the AI algorithm output-data-type information may include at least one of: information of a desired cell selection/re-selection path; an updated AI algorithm; a modification strategy for an AI algorithm input parameter; a modification strategy for an AI algorithm output parameter; or decision-making information for target cell determination during cell selection/re-selection.

Optionally, the decision-making information for target cell determination above is used for the first terminal device to obtain, according to the AI algorithm input data, characteristic information of a target cell. The characteristic information of the target cell includes at least one of: CGI information corresponding to the target cell; frequency related information of the target cell; or PCI information of the target cell.

Optionally, the AI-related data above includes at least one of AI algorithm input data, AI algorithm output data, or AI algorithm intermediate data.

Optionally, the configuration information of the triggering event for AI-related data feedback above includes event type information and/or configuration information associated with the event, where the event is used to trigger the first terminal device to feed back the AI-related data to the second terminal device.

Optionally, an event type indicated by the event type information above includes at least one of: expiry of a data-feedback timer; arrival of data-feedback absolute time; expiry of a periodical data-feedback timer; memory occupied by AI-related data stored in the first terminal device exceeds a first threshold; a measurement result of a serving cell signal is greater than or equal to a second threshold; or the measurement result of the serving cell signal is greater than or equal to a third threshold, and a duration for which the measurement result of the serving cell signal is greater than or equal to the third threshold reaches a first duration.

Optionally, the data-feedback timer, the data-feedback absolute time, the periodical data-feedback timer, the first threshold, the second threshold, the third threshold, or the first duration is configured in at least one of the following manners: a system broadcast message; dedicated signaling; or a default value.

Optionally, the method above further includes the following. The second terminal device receives the AI-related data from the first terminal device, if triggered by the preset event. The preset event includes at least one of: first indication information is received by the first terminal device from the second terminal device, where the first indication information is used to request the first terminal device to feed back the AI-related data to the second terminal device; the first terminal device determines that an AI algorithm needs to be updated; the first terminal device determines that an AI algorithm input parameter strategy needs to be modified; the first terminal device determines that an AI algorithm output parameter strategy needs to be modified; a measurement result of a serving cell signal is greater than or equal to a fourth threshold; or the measurement result of the serving cell signal is greater than or equal to a fifth threshold, and a duration for which the measurement result of the serving cell signal is greater than or equal to the fifth threshold reaches a second duration.

Optionally, the fourth threshold, the fifth threshold, or the second duration is configured in at least one of the following manners: a system broadcast message; dedicated signaling; or a default value.

Optionally, the format requirement for AI-related data feedback includes a type requirement for data that needs to be fed back and/or a type-accuracy requirement for data that needs to be fed back.

Optionally, before receiving AI-related data fed back by the first terminal device, the method may further include the following. Receive a first message from the first terminal device, where the first message indicates that the second terminal device is to extract the AI-related data.

Optionally, after receiving the first message, the method may further include the following. Send a second message to the first terminal device, where the second message is used to confirm that the AI-related data can be fed back.

Optionally, before receiving AI-related data fed back by the first terminal device, the method may further include the following. Establish an AI data transmission safety mechanism.

Optionally, the method above further includes the following. Interact second capability indication information with the first terminal device, where the second capability indication information is used to inform the second terminal device whether the first terminal device supports an AI function.

Figure 7:
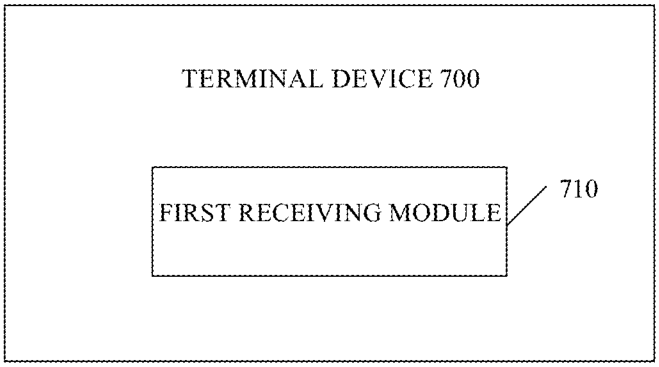
FIG. 7 is a schematic structural diagram of a terminal device 700 according to embodiments of the disclosure.

A terminal device is proposed in embodiments of the disclosure. FIG. 7 is a schematic structural diagram of a terminal device 700 according to embodiments of the disclosure. The terminal device 700 includes a first receiving module 710. The first receiving module 710 is configured to receive AI control information from a network device or a second terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

Optionally, an application scenario indicated by the application-scenario identity information above includes at least one of: a random-access scenario, a cell selection/re-selection scenario, a network-selection scenario, a cell-measurement scenario, a paging scenario, or a handover scenario.

Optionally, an optimization goal indicated by the optimization goal information above includes at least one of: energy saving, latency reduction, data throughput enhancement, data BER reduction, QoS level improvement, or service continuity enhancement.

Optionally, if the application-scenario identity information above indicates the random-access scenario, a data type indicated by the AI algorithm input-data-type information above includes at least one of: geographical location information of the terminal device; a measurement result of a serving cell; a measurement result of at least one neighboring cell; an evaluation result of an RACH busy ratio; an evaluation result of channel interference; or an RACH history report.

Optionally, if the application-scenario identity information above indicates the random-access scenario, a data type indicated by the AI algorithm output-data-type information includes at least one of: desired random-access configuration; an updated AI algorithm; a modification strategy for an AI algorithm input parameter; a modification strategy for an AI algorithm output parameter; or a selection strategy for random-access configuration.

Optionally, the selection strategy for random-access configuration is used for the terminal device to select, according to the AI algorithm input data, target random-access configuration. The target random-access configuration includes at least one of: a location of an RO corresponding to a random-access attempt; a type of a random-access code corresponding to the random-access attempt; a level of random-access transmission power corresponding to the random-access attempt; or an ID of a target SSB corresponding to the random-access attempt or an ID of a CSI-RS corresponding to the random-access attempt Optionally, if the application-scenario identity information above indicates the cell selection/re-selection scenario, a data type indicated by the AI algorithm input-data-type information includes at least one of: information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on MDT; or cell deployment related information.

Optionally, the cell deployment related information above can provide basic information of a cell within a zone. The basic information includes at least one of: zone ID information; geographical coordinate information of each cell within the zone; frequency resource related information of each cell within the zone; PCI information of each cell within the zone; CGI information of each cell within the zone; coverage area information of each cell within the zone; history load information of each cell within the zone; a service type supported by each cell within the zone; or information of a slice type supported by each cell within the zone.

Optionally, the cell deployment related information may be provided by the network device through common signaling and/or dedicated signaling. Alternatively, the cell deployment related information may be provided by the second terminal device through at least one of unicast signaling, multicast signaling, or broadcast signaling.

Optionally, if the application-scenario identity information above indicates the cell selection/re-selection scenario, a data type indicated by the AI algorithm output-data-type information may include at least one of: information of a desired cell selection/re-selection path; an updated AI algorithm; a modification strategy for an AI algorithm input parameter; a modification strategy for an AI algorithm output parameter; or decision-making information for target cell determination during cell selection/re-selection.

Optionally, the decision-making information for target cell determination above is used for the first terminal device to obtain, according to the AI algorithm input data, characteristic information of a target cell. The characteristic information of the target cell includes at least one of: CGI information corresponding to the target cell; frequency related information of the target cell; or PCI information of the target cell.

Optionally, the AI-related data above includes at least one of AI algorithm input data, AI algorithm output data, or AI algorithm intermediate data.

Optionally, the configuration information of the triggering event for AI-related data feedback above includes event type information and/or configuration information associated with an event, where the event is used to trigger the terminal device to feed back the AI-related data to the network device or the second terminal device.

Optionally, an event type indicated by the event type information above includes at least one of: expiry of a data-feedback timer; arrival of data-feedback absolute time; expiry of a periodical data-feedback timer; memory occupied by AI-related data stored in the terminal device exceeds a first threshold; a measurement result of a serving cell signal is greater than or equal to a second threshold; or the measurement result of the serving cell signal is greater than or equal to a third threshold, and a duration for which the measurement result of the serving cell signal is greater than or equal to the third threshold reaches a first duration.

Optionally, the data-feedback timer, the data-feedback absolute time, the periodical data-feedback timer, the first threshold, the second threshold, the third threshold, or the first duration is configured in at least one of the following manners: a system broadcast message; dedicated signaling; or a default value.

Figure 8:
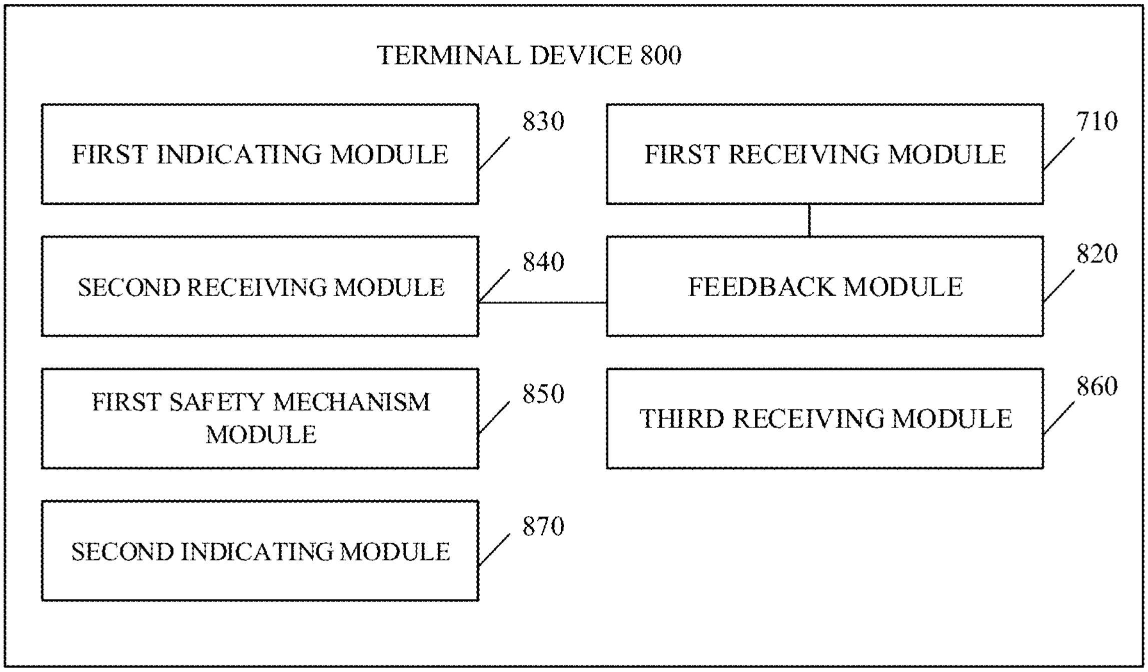
FIG. 8 is a schematic structural diagram of a terminal device 800 according to embodiments of the disclosure.

Another terminal device is further proposed in embodiments of the disclosure. FIG. 8 is a schematic structural diagram of a terminal device 800 according to embodiments of the disclosure. The terminal device 800 includes a first receiving module 710. The terminal device 800 further includes a feedback module 820. The feedback module 820 is configured to feed back the AI-related data to the network device or the second terminal device if triggered by the preset event. The preset event includes at least one of: first indication information is received from the network device, where the first indication information is used to request the terminal device to feed back the AI-related data to the network device; second indication information is received from the network device, where the first indication information is used to request the terminal device to feed back the AI-related data to the second terminal device; the terminal device determines that an AI algorithm needs to be updated; the terminal device determines that an AI algorithm input parameter strategy needs to be modified; the terminal device determines that an AI algorithm output parameter strategy needs to be modified; a measurement result of a serving cell signal is greater than or equal to a fourth threshold; or the measurement result of the serving cell signal is greater than or equal to a fifth threshold, and a duration for which the measurement result of the serving cell signal is greater than or equal to the fifth threshold reaches a second duration.

Optionally, the fourth threshold, the fifth threshold, or the second duration is configured in at least one of the following manners: a system broadcast message; dedicated signaling; or a default value.

Optionally, the format requirement for AI-related data feedback includes a type requirement for data that needs to be fed back and/or a type-accuracy requirement for data that needs to be fed back.

As illustrated in FIG. 8, the terminal device above may further include a first indicating module 830. The first indicating module 830 is configured to send a first message to the network device or the second terminal device, where the first message indicates that the network device or the second terminal device is to extract AI-related data.

As illustrated in FIG. 8, the terminal device above may further include a second receiving module 840. The second receiving module 840 is configured to receive a second message from the network device or the second terminal device, where the second message is used to confirm that the AI-related data can be fed back.

As illustrated in FIG. 8, the terminal device above may further include a first safety mechanism module 850. The first safety mechanism module 850 is configured to establish an AI data transmission safety mechanism and activate the AI data transmission safety mechanism.

As illustrated in FIG. 8, the terminal device above may further include a third receiving module 860. The third receiving module 860 is configured to receive third indication information from the network device, where the third indication information indicates whether a current network supports an AI function.

Optionally, the third indication information above is carried in at least one of: a common signaling message; a dedicated signaling message; or an NAS message.

As illustrated in FIG. 8, the terminal device above may further include a second indicating module 870. The second indicating module 870 is configured to send first capability indication information to the network device, where the first capability indication information is used to inform the network device whether the terminal device supports an AI function; or to interact second capability indication information with the second terminal device, where the second capability indication information is used to inform the second terminal device whether the terminal device supports the AI function.

Optionally, the network device above includes an access-network device or a core-network device.

It may be understood that, the foregoing and other operations and/or functions of various modules in the terminal device according to embodiments of the disclosure are respectively intended for implementing corresponding procedures of the terminal device in the method 200 illustrated in FIG. 2, which will not be repeated herein for the sake of brevity.

Figure 9:
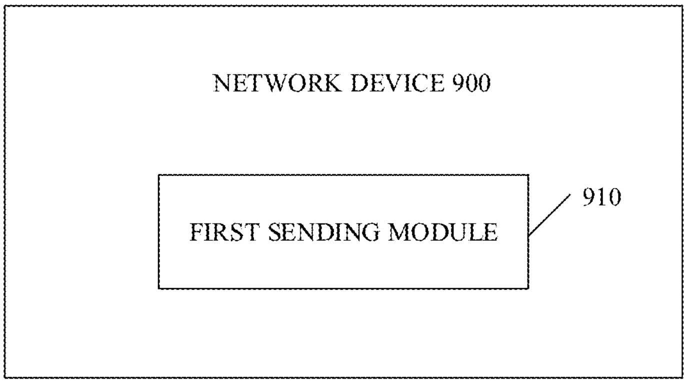
FIG. 9 is a schematic structural diagram of a network device 900 according to embodiments of the disclosure.

A network device is proposed in embodiments of the disclosure. FIG. 9 is a schematic structural diagram of a network device 900 according to embodiments of the disclosure. The network device 900 includes a first sending module 910. The first sending module 910 is configured to send AI control information to a first terminal device, where the AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

Optionally, an application scenario indicated by the application-scenario identity information above includes at least one of: a random-access scenario, a cell selection/re-selection scenario, a network-selection scenario, a cell-measurement scenario, a paging scenario, or a handover scenario.

Optionally, an optimization goal indicated by the optimization goal information includes at least one of: energy saving, latency reduction, data throughput enhancement, data BER reduction, QoS level improvement, or service continuity enhancement.

Optionally, if the application-scenario identity information indicates the random-access scenario, a data type indicated by the AI algorithm input-data-type information includes at least one of: geographical location information of the first terminal device; a measurement result of a serving cell; a measurement result of at least one neighboring cell; an evaluation result of a RACH busy ratio; an evaluation result of channel interference; or an RACH history report.

Optionally, if the application-scenario identity information above indicates the random-access scenario, a data type indicated by the AI algorithm output-data-type information may include at least one of: desired random-access configuration; an updated AI algorithm; a modification strategy for an AI algorithm input parameter; a modification strategy for an AI algorithm output parameter; or a selection strategy for random-access configuration.

Optionally, the selection strategy for random-access configuration above is used for the first terminal device to select, according to the AI algorithm input data, target random-access configuration, where the target random-access configuration includes at least one of: a location of an RO corresponding to the random-access attempt; a type of a random-access code corresponding to the random-access attempt; a level of random-access transmission power corresponding to the random-access attempt; or an ID of a target SSB corresponding to the random-access attempt or an ID of a CSI-RS corresponding to the random-access attempt.

Optionally, if the application-scenario identity information above indicates the cell selection/re-selection scenario, a data type indicated by the AI algorithm input-data-type information includes at least one of: information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on MDT; or cell deployment related information.

Optionally, the cell deployment related information above can provide basic information of a cell within a zone. The basic information includes at least one of: zone ID information; geographical coordinate information of each cell within the zone; frequency resource related information of each cell within the zone; PCI information of each cell within the zone; CGI information of each cell within the zone; coverage area information of each cell within the zone; history load information of each cell within the zone; a service type supported by each cell within the zone; or information of a slice type supported by each cell within the zone.

Optionally, the cell deployment related information may be provided by the network device through common signaling and/or dedicated signaling.

Optionally, if the application-scenario identity information above indicates the cell selection/re-selection scenario, a data type indicated by the AI algorithm output-data-type information may include at least one of: information of a desired cell selection/re-selection path; an updated AI algorithm; a modification strategy for an AI algorithm input parameter; a modification strategy for an AI algorithm output parameter; or decision-making information for target cell determination during cell selection/re-selection.

Optionally, the decision-making information for target cell determination above is used for the first terminal device to obtain, according to the AI algorithm input data, characteristic information of a target cell. The characteristic information of the target cell includes at least one of: CGI information corresponding to the target cell; frequency related information of the target cell; or PCI information of the target cell.

Optionally, the AI-related data above includes at least one of AI algorithm input data, AI algorithm output data, or AI algorithm intermediate data.

Optionally, the configuration information of the triggering event for AI-related data feedback above includes event type information and/or configuration information associated with the event, where the event is used to trigger the first terminal device to feed back the AI-related data to the network device.

Optionally, an event type indicated by the event type information above includes at least one of: expiry of a data-feedback timer; arrival of data-feedback absolute time; expiry of a periodical data-feedback timer; memory occupied by AI-related data stored in the first terminal device exceeds a first threshold; a measurement result of a serving cell signal is greater than or equal to a second threshold; or the measurement result of the serving cell signal is greater than or equal to a third threshold, and a duration for which the measurement result of the serving cell signal is greater than or equal to the third threshold reaches a first duration.

Optionally, the data-feedback timer, the data-feedback absolute time, the periodical data-feedback timer, the first threshold, the second threshold, the third threshold, or the first duration is configured in at least one of the following manners: a system broadcast message; dedicated signaling; or a default value.

Figure 10:
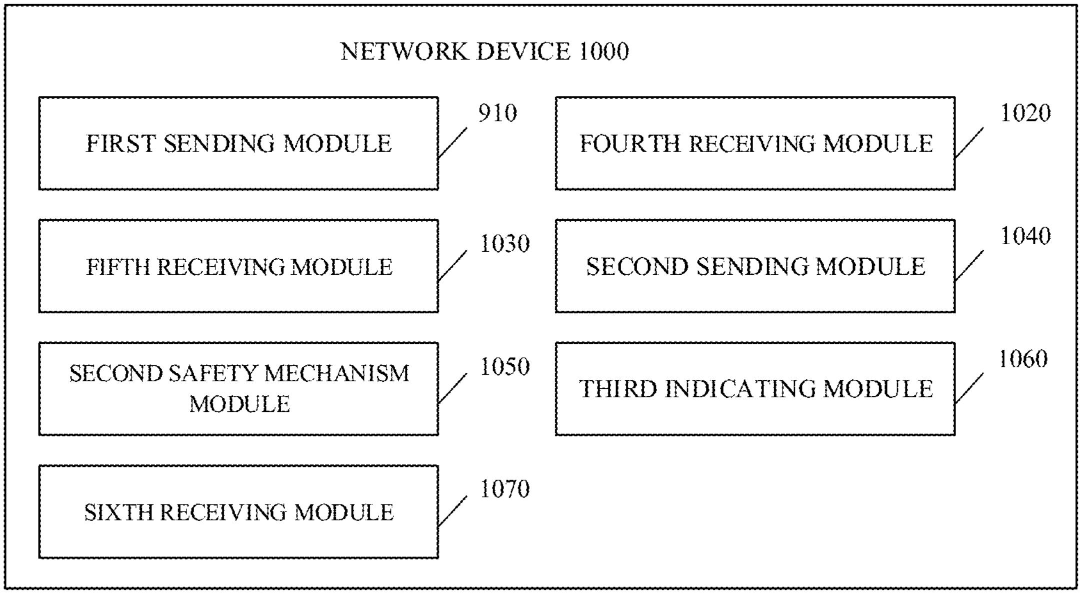
FIG. 10 is a schematic structural diagram of a network device 1000 according to embodiments of the disclosure.

A network device is further proposed in embodiments of the disclosure. FIG. 10 is a schematic structural diagram of a network device 1000 according to embodiments of the disclosure. The network device 1000 includes a first sending module 910. The network device 1000 further includes a fourth receiving module 1020. The fourth receiving module 1020 is configured to receive AI-related data from the first terminal device if triggered by a preset event. The preset event includes at least one of the following: first indication information is received by the first terminal device from the network device, where the first indication information is used to request the first terminal device to feed back the AI-related data to the network device; the first terminal device determines that an AI algorithm needs to be updated; the first terminal device determines that an AI algorithm input parameter strategy needs to be modified; the first terminal device determines that an AI algorithm output parameter strategy needs to be modified; a measurement result of a serving cell signal is greater than or equal to a fourth threshold; or the measurement result of the serving cell signal is greater than or equal to a fifth threshold, and a duration for which the measurement result of the serving cell signal is greater than or equal to the fifth threshold reaches a second duration.

Optionally, the fourth threshold, the fifth threshold, or the second duration is configured in at least one of the following manners: a system broadcast message; dedicated signaling; or a default value.

Optionally, the format requirement for AI-related data feedback includes a type requirement for data that needs to be fed back and/or a type-accuracy requirement for data that needs to be fed back.

As illustrated in FIG. 10, the network device above may further include a fifth receiving module 1030. The fifth receiving module 1030 is configured to receive a first message from the first terminal device, where the first message indicates that the network device is to extract the AI-related data.

As illustrated in FIG. 10, the network device above may further include a second sending module 1040. The second sending module 1040 is configured to send a second message to the first terminal device, where the second message is used to confirm that the AI-related data can be fed back.

As illustrated in FIG. 10, the network device above may further include a second safety mechanism module 1050.

The second safety mechanism module 1050 is configured to establish an AI data transmission safety mechanism.

As illustrated in FIG. 10, the network device above may further include a third indicating module 1060. The third indicating module 1060 is configured to send third indication information to the first terminal device, where the third indication information indicates whether a current network supports an AI function.

Optionally, the third indication information is carried in at least one of: a common signaling message; a dedicated signaling message; or an NAS message.

As illustrated in FIG. 10, the network device above may further include a sixth receiving module 1070. The sixth receiving module 1070 is configured to receive first capability indication information from the first terminal device, where the first capability indication information is used to inform the network device whether the first terminal device supports an AI function.

Optionally, the network device includes an access-network device or a core-network device.

It may be understood that, the foregoing and other operations and/or functions of various modules in the network device according to embodiments of the disclosure are respectively intended for implementing corresponding procedures of the network device in the method 500 illustrated in FIG. 5, which will not be repeated herein for the sake of brevity.

Figure 11:
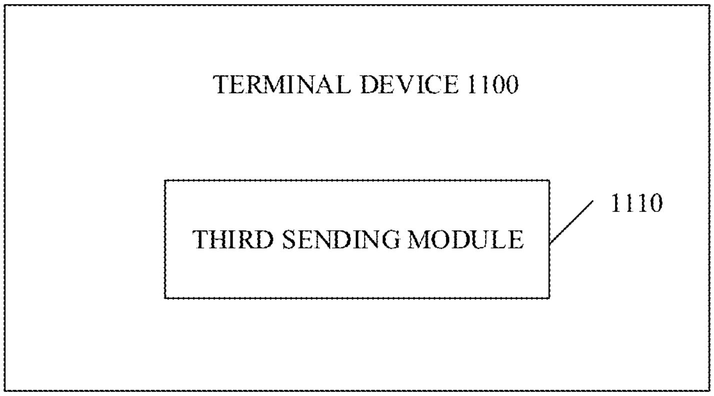
FIG. 11 is a schematic structural diagram of a terminal device 1100 according to embodiments of the disclosure.

A terminal device is further proposed in embodiments of the disclosure. FIG. 11 is a schematic structural diagram of a terminal device 1100 according to embodiments of the disclosure. The terminal device 1100 includes a third sending module 1110. The third sending module 1110 is configured to send AI control information to the first terminal device. The AI control information includes at least one of: AI algorithm information, application-scenario identity information, optimization goal information, AI algorithm input-data-type information, AI algorithm output-data-type information, configuration information of a triggering event for AI-related data feedback, or a format requirement for AI-related data feedback.

Optionally, an application scenario indicated by the application-scenario identity information above includes at least one of: a random-access scenario, a cell selection/re-selection scenario, a network-selection scenario, a cell-measurement scenario, a paging scenario, or a handover scenario.

Optionally, an optimization goal indicated by the optimization goal information above includes at least one of: energy saving, latency reduction, data throughput enhancement, data BER reduction, QoS level improvement, or service continuity enhancement.

Optionally, if the application-scenario identity information above indicates the random-access scenario, a data type indicated by the AI algorithm input-data-type information includes at least one of: geographical location information of the first terminal device; a measurement result of a serving cell; a measurement result of at least one neighboring cell; an evaluation result of an RACH busy ratio; an evaluation result of channel interference; or an RACH history report.

Optionally, if the application-scenario identity information above indicates the random-access scenario, a data type indicated by the AI algorithm output-data-type information may include at least one of: desired random-access configuration; an updated AI algorithm; a modification strategy for an AI algorithm input parameter; a modification strategy for an AI algorithm output parameter; or a selection strategy for random-access configuration.

Optionally, the selection strategy for random-access configuration above is used for the first terminal device to select, according to the AI algorithm input data, target random-access configuration, where the target random-access configuration includes at least one of: a location of an RO corresponding to the random-access attempt; a type of a random-access code corresponding to the random-access attempt; a level of random-access transmission power corresponding to the random-access attempt; or an ID of a target SSB corresponding to the random-access attempt or an ID of a CSI-RS corresponding to the random-access attempt.

Optionally, if the application-scenario identity information above indicates the cell selection/re-selection scenario, a data type indicated by the AI algorithm input-data-type information includes at least one of: information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on MDT; or cell deployment related information.

Optionally, the cell deployment related information above can provide basic information of a cell within a zone. The basic information includes at least one of: zone ID information; geographical coordinate information of each cell within the zone; frequency resource related information of each cell within the zone; PCI information of each cell within the zone; CGI information of each cell within the zone; coverage area information of each cell within the zone; history load information of each cell within the zone; a service type supported by each cell within the zone; or information of a slice type supported by each cell within the zone.

Optionally, the cell deployment related information above may be provided by the terminal device through unicast signaling, multicast signaling, or broadcast signaling.

Optionally, if the application-scenario identity information above indicates the cell selection/re-selection scenario, a data type indicated by the AI algorithm output-data-type information may include at least one of: information of a desired cell selection/re-selection path; an updated AI algorithm; a modification strategy for an AI algorithm input parameter; a modification strategy for an AI algorithm output parameter; or decision-making information for target cell determination during cell selection/re-selection.

Optionally, the decision-making information for target cell determination above is used for the first terminal device to obtain, according to the AI algorithm input data, characteristic information of a target cell. The characteristic information of the target cell includes at least one of: CGI information corresponding to the target cell; frequency related information of the target cell; or PCI information of the target cell.

Optionally, the AI-related data above includes at least one of AI algorithm input data, AI algorithm output data, or AI algorithm intermediate data.

Optionally, the configuration information of the triggering event for AI-related data feedback above includes event type information and/or configuration information associated with the event, where the event is used to trigger the first terminal device to feed back the AI-related data to the terminal device.

Optionally, an event type indicated by the event type information above includes at least one of the following:

expiry of a data-feedback timer; arrival of data-feedback absolute time; expiry of a periodical data-feedback timer; memory occupied by AI-related data stored in the first terminal device exceeds a first threshold; a measurement result of a serving cell signal is greater than or equal to a second threshold; or the measurement result of the serving cell signal is greater than or equal to a third threshold, and a duration for which the measurement result of the serving cell signal is greater than or equal to the third threshold reaches a first duration.

Optionally, the data-feedback timer, the data-feedback absolute time, the periodical data-feedback timer, the first threshold, the second threshold, the third threshold, or the first duration is configured in at least one of the following manners: a system broadcast message; dedicated signaling; or a default value.

Figure 12:
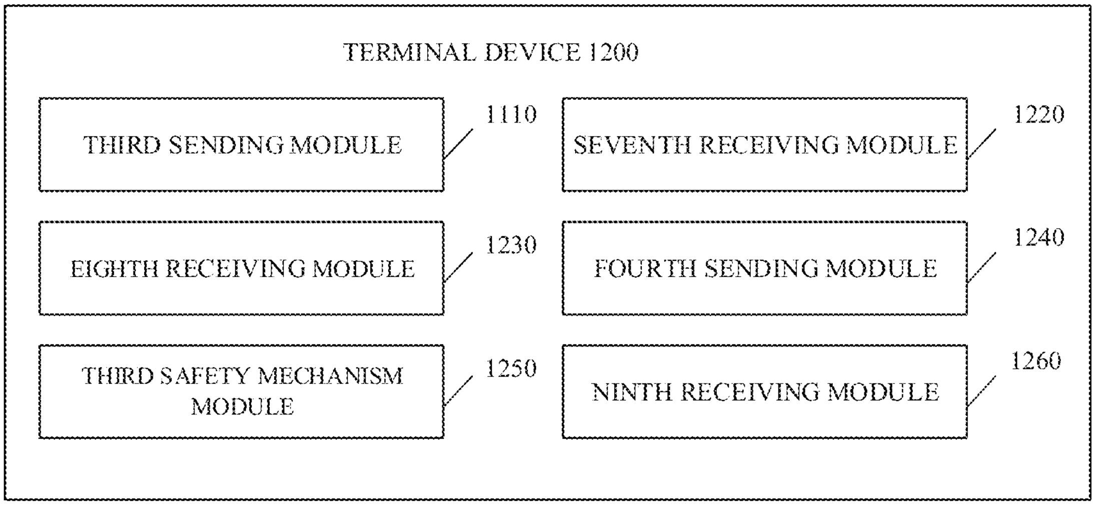
FIG. 12 is a schematic structural diagram of a terminal device 1200 according to embodiments of the disclosure.

A terminal device is further proposed in embodiments of the disclosure. FIG. 12 is a schematic structural diagram of a terminal device 1200 according to embodiments of the disclosure. The terminal device 1200 includes a third sending module 1110. The terminal device 1200 further includes a seventh receiving module 1220. The seventh receiving module 1220 is configured to receive AI-related data from the first terminal device if triggered by a preset event. The preset event includes at least one of: first indication information is received by the first terminal device from the terminal device, where the first indication information is used to request the first terminal device to feed back the AI-related data to the terminal device; the first terminal device determines that an AI algorithm needs to be updated; the first terminal device determines that an AI algorithm input parameter strategy needs to be modified; the first terminal device determines that an AI algorithm output parameter strategy needs to be modified; a measurement result of a serving cell signal is greater than or equal to a fourth threshold; or the measurement result of the serving cell signal is greater than or equal to a fifth threshold, and a duration for which the measurement result of the serving cell signal is greater than or equal to the fifth threshold reaches a second duration.

Optionally, the fourth threshold, the fifth threshold, or the second duration is configured in at least one of the following manners: a system broadcast message; dedicated signaling; or a default value.

Optionally, the format requirement for AI-related data feedback includes a type requirement for data that needs to be fed back and/or a type-accuracy requirement for data that needs to be fed back.

As illustrated in FIG. 12, the terminal device above may further include an eighth receiving module 1230. The eighth receiving module 1230 is configured to receive a first message from the first terminal device, where the first message indicates that the terminal device is to extract AI-related data.

As illustrated in FIG. 12, the terminal device above may further include a fourth sending module 1240. The fourth sending module 1240 is configured to send a second message to the first terminal device, where the second message is used to confirm that the AI-related data can be fed back.

As illustrated in FIG. 12, the terminal device above may further include a third safety mechanism module 1250. The third safety mechanism module 1250 is configured to establish an AI data transmission safety mechanism.

As illustrated in FIG. 12, the terminal device above may further include a ninth receiving module. The ninth receiving module is configured to receive second capability indication information from the first terminal device, where the second capability indication information is used to inform the terminal device whether the first terminal device supports an AI function.

It may be understood that, the foregoing and other operations and/or functions of various modules in the network device according to embodiments of the disclosure are respectively intended for implementing corresponding procedures of the terminal device in the method 600 illustrated in FIG. 6, which will not be repeated herein for the sake of brevity.

It is to be noted that, the functions described with respect to each module (sub-module, unit, or component, and the like) of the terminal device and network device in embodiments of the disclosure can be implemented by different modules (sub-modules, units, or components, and the like) or by the same module (sub-module, unit, or component, and the like). For example, a first receiving module and a second receiving module may be different modules, or may also be the same module, both of which can implement the corresponding functions in embodiments of the disclosure. In addition, the sending module and the receiving module in embodiments of the disclosure can be implemented by the transceiver of the device, and part or all of the remaining modules can be implemented by the processor of the device.

Figure 13:
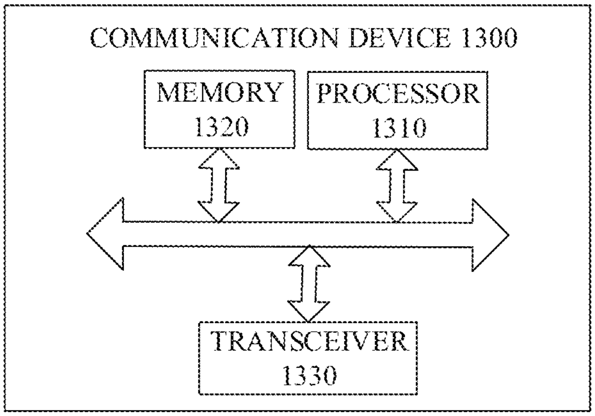
FIG. 13 is a schematic structural diagram of a communication device 1300 according to embodiments of the disclosure.

FIG. 13 is a schematic structural diagram of a communication device 1300 according to embodiments of the disclosure. The communication device 1300 illustrated in FIG. 13 includes a processor 1310. The processor 1310 can invoke and execute a computer program stored in a memory, to implement the method in embodiments of the disclosure.

Optionally, as illustrated in FIG. 13, the communication device 1300 may further include a memory 1320, where the processor 1310 can invoke and execute a computer program stored in the memory 1320, to implement the method in embodiments of the disclosure.

The memory 1320 may be a separate device independent of the processor 1310, or may be integrated into the processor 1310.

Optionally, as illustrated in FIG. 13, the communication device 1300 may further include a transceiver 1330. The processor 1310 can control the transceiver 1330 to communicate with other devices, and specifically, to send information or data to other devices or receive information or data sent by other devices.

The transceiver 1330 may include a transmitter and a receiver. The transceiver 1330 may further include an antenna, where one or more antennas may be provided.

Optionally, the communication device 1300 may be the terminal device in embodiments of the disclosure, and the communication device 1300 may implement corresponding operations implemented by the terminal device in various methods in embodiments of the disclosure, which will not be repeated herein for the sake of brevity.

Optionally, the communication device 1300 may be the network device in embodiments of the disclosure, and the communication device 1300 may implement corresponding operations implemented by the network device in various methods in embodiments of the disclosure, which will not be repeated herein for the sake of brevity.

Figure 14:
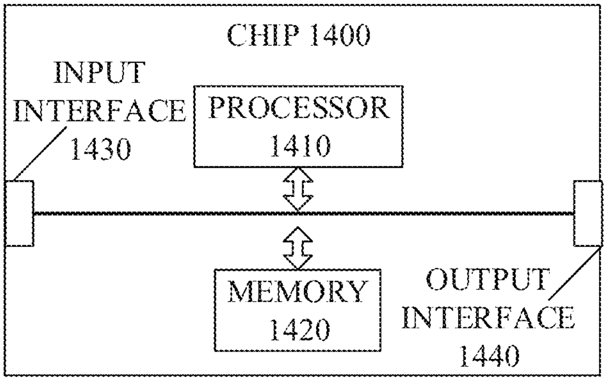
FIG. 14 is a schematic structural diagram of a chip 1400 according to embodiments of the disclosure.

FIG. 14 is a schematic structural diagram of a chip 1400 according to embodiments of the disclosure. The chip 1400 illustrated in FIG. 14 includes a processor 1410. The processor 1410 can invoke and execute a computer program stored in a memory, so as to implement the method in embodiments of the disclosure.

Optionally, as illustrated in FIG. 14, the chip 1400 may further include a memory 1420. The processor 1410 can invoke and execute a computer program stored in the memory 1420, so as to implement the method in embodiments of the disclosure.

The memory 1420 may be a separate device independent of the processor 1410, or may be integrated into the processor 1410.

Optionally, the chip 1400 may further include an input interface 1430. The processor 1410 can control the input interface 1430 to communicate with other devices or chips, and specifically, to obtain information or data sent by other devices or chips.

Optionally, the chip 1400 may further include an output interface 1440. The processor 1410 can control the output interface 1440 to communicate with other devices or chips, and specifically, to output information or data to other devices or chips.

Optionally, the chip may be applied to the terminal device in embodiments of the disclosure, and the chip may implement corresponding operations implemented by the terminal device in various methods in embodiments of the disclosure, which will not be repeated herein for the sake of brevity.

Optionally, the chip may be applied to the network device in embodiments of the disclosure, and the chip may implement corresponding operations implemented by the network device in various methods in embodiments of the disclosure, which will not be repeated herein for the sake of brevity.

It may be understood that, the chip in embodiments of the disclosure may also be referred to as a system-on-chip (SOC).

The processor mentioned above may be a general-purpose processor, a digital signal processor (DSP), a field programmable gate array (FPGA), an application specific integrated circuit (ASIC), or other programmable logic devices, transistor logic devices, discrete hardware components. The general-purpose processor may be a microprocessor, or the processor may be any conventional processor or the like.

The memory mentioned above may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or flash memory. The volatile memory may be a random access memory (RAM).

It may be understood that, the memory above is intended for illustration rather than limitation. For example, the memory in embodiments of the disclosure may also be a static RAM (SRAM), a dynamic RAM (DRAM), a synchronous DRAM (SDRAM), an enhanced SDRAM (ESDRAM), a synch link DRAM (SLDRAM), a direct rambus RAM (DR RAM), or the like. In other words, the memory in embodiments of the disclosure is intended to include, but is not limited to, these and any other suitable types of memory.

All or some of the above embodiments can be implemented through software, hardware, firmware, or any other combination thereof. When implemented by software, all or some of the above embodiments can be implemented in the form of a computer program product. The computer program product includes one or more computer instructions. When the computer instructions are applied and executed on a computer, all or some of the operations or functions of the embodiments of the disclosure are performed. The computer may be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner may be a coaxial cable, an optical fiber, a digital subscriber line (DSL), or the like. The wireless manner may be, for example, infrared, wireless, microwave, or the like. The computer-readable storage medium may be any computer accessible usable-medium or a data storage device such as a server, a data center, or the like which is integrated with one or more usable media. The usable medium may be a magnetic medium (such as a soft disc, a hard disc, or a magnetic tape), an optical medium (such as a digital video disc (DVD)), or a semiconductor medium (such as a solid state disk (SSD)), or the like.

It may be understood that, in various method embodiments of the disclosure, the magnitude of a sequence number of each of the foregoing processes does not mean an execution order, and an execution order of each process can be determined according to a function and an internal logic of the process, which shall not constitute any limitation to an implementation process of embodiments of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be repeated herein.

The foregoing elaborations are merely embodiments of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A control method, applicable to a first terminal device and comprising:

receiving, by the first terminal device, artificial intelligence (AI) control information from a network device or a second terminal device, the AI control information comprising AI algorithm output-data-type information;

wherein when the control method is applied to cell selection/re-selection scenario, a data type indicated by the AI algorithm output-data-type information comprises: decision-making information for target cell determination during cell selection/re-selection, wherein the decision-making information for target cell determination is used by the first terminal device to obtain characteristic information of a target cell according to AI algorithm input data; or wherein when the control method is applied to random-access scenario, a data type indicated by the AI algorithm output-data-type information comprises a selection strategy for random-access configuration, wherein the selection strategy for random-access configuration is used by the first terminal device to select target random-access configuration according to AI algorithm input data.

2. The method of claim 1, wherein the AI control information further comprises optimization goal information, and an optimization goal indicated by the optimization goal information comprises at least one of: energy saving, latency reduction, data throughput enhancement, data bit error rate (BER) reduction, quality of service (QoS) level improvement, or service continuity enhancement.

3. The method of claim 1, wherein the AI control information further comprises AI algorithm input-data-type information, and when the control method is applied to the random-access scenario, a data type indicated by the AI algorithm input-data-type information comprises at least one of:

geographical location information of the first terminal device; a measurement result of a serving cell; a measurement result of at least one neighboring cell; an evaluation result of a random access channel (RACH) busy ratio; an evaluation result of channel interference; or an RACH history report.

4. The method of claim 1, wherein when the control method is applied to the random-access scenario, the data type indicated by the AI algorithm output-data-type information further comprises at least one of:

desired random-access configuration; an updated AI algorithm; a modification strategy for an AI algorithm input parameter; or a modification strategy for an AI algorithm output parameter.

5. The method of claim 1, wherein the target random-access configuration comprises at least one of:

a location of an RACH occasion (RO) corresponding to a random-access attempt;

a type of a random-access code corresponding to the random-access attempt;

a level of random-access transmission power corresponding to the random-access attempt; or an identifier (ID) of a target synchronization signal block (SSB) corresponding to the random-access attempt or an ID of a channel state information-reference signal (CSI-RS) corresponding to the random-access attempt.

6. The method of claim 1, wherein the AI control information further comprises AI algorithm input-data-type information, and when the control method is applied to the cell selection/re-selection scenario, a data type indicated by the AI algorithm input-data-type information comprises at least one of:

information of a user-desired destination; information of a user-desired service type; information of a user-desired slice type; geographical location information of the first terminal device; a measurement result of a serving cell; a measurement result of at least one neighboring cell; history data on cell selection/re-selection for the first terminal device; an evaluation result of channel interference; a log report on minimization of drive test (MDT); or cell deployment related information.

7. The method of claim 6, wherein the cell deployment related information provides basic information of a cell within a zone, wherein the basic information comprises at least one of:

zone ID information;

geographical coordinate information of each cell within the zone;

frequency resource related information of each cell within the zone;

physical cell identity (PCI) information of each cell within the zone;

cell global identity (CGI) information of each cell within the zone;

coverage area information of each cell within the zone;

history load information of each cell within the zone;

a service type supported by each cell within the zone; or information of a slice type supported by each cell within the zone.

8. The method of claim 1, wherein when the control method is applied to the cell selection/re-selection scenario, the data type indicated by the AI algorithm output-data-type information further comprises at least one of:

information of a desired cell selection/re-selection path; an updated AI algorithm; a modification strategy for an AI algorithm input parameter; or a modification strategy for an AI algorithm output parameter.

9. The method of claim 1, wherein the characteristic information of the target cell comprises at least one of:

CGI information corresponding to the target cell; frequency related information of the target cell; or PCI information of the target cell.

10. The method of claim 1, wherein the AI control information further comprises configuration information of a triggering event for AI-related data feedback, and the configuration information of the triggering event for AI-related data feedback comprises event type information and/or configuration information associated with the event, wherein the event is used to trigger the first terminal device to feed back AI-related data to the network device or the second terminal device.

11. The method of claim 10, wherein an event type indicated by the event type information comprises at least one of:

expiry of a data-feedback timer;

arrival of data-feedback absolute time;

expiry of a periodical data-feedback timer;

memory occupied by AI-related data stored in the first terminal device exceeds a first threshold;

a measurement result of a serving cell signal is greater than or equal to a second threshold; or the measurement result of the serving cell signal is greater than or equal to a third threshold, and a duration for which the measurement result of the serving cell signal is greater than or equal to the third threshold reaches a first duration.

12. The method of claim 1, further comprising:

feeding back, by the first terminal device, AI-related data to the network device or the second terminal device, when triggered by a preset event, wherein the preset event comprises at least one of:

reception of first indication information from the network device, wherein the first indication information is used to request the first terminal device to feed back the AI-related data to the network device;

reception of second indication information from the second terminal device, wherein the second indication information is used to request the first terminal device to feed back the AI-related data to the second terminal device;

the first terminal device determines that an AI algorithm needs to be updated;

the first terminal device determines that an AI algorithm input parameter strategy needs to be modified;

the first terminal device determines that an AI algorithm output parameter strategy needs to be modified;

a measurement result of a serving cell signal is greater than or equal to a fourth threshold; or the measurement result of the serving cell signal is greater than or equal to a fifth threshold, and a duration for which the measurement result of the serving cell signal is greater than or equal to the fifth threshold reaches a second duration.

13. The method of claim 1, wherein the AI control information further comprises a format requirement for AI-related data feedback, wherein the format requirement for AI-related data feedback comprises a type requirement for data that needs to be fed back and/or a type-accuracy requirement for data that needs to be fed back.

14. The method of claim 1, wherein the AI control information further comprises application scenario identity information, wherein the application scenario identity information indicates one of the cell selection/re-selection scenario and the random-access scenario.

15. A control method, applicable to a network device and comprising:

sending, by the network device, artificial intelligence (AI) control information to a first terminal device, the AI control information comprising AI algorithm output-data-type information;

wherein when the control method is applied to cell selection/re-selection scenario, a data type indicated by the AI algorithm output-data-type information comprises decision-making information for target cell determination during cell selection/re-selection, wherein the decision-making information for target cell determination is used by the first terminal device to obtain characteristic information of a target cell according to AI algorithm input data; or wherein when the control method is applied to random-access scenario, a data type indicated by the AI algorithm output-data-type information comprises a selection strategy for random-access configuration, wherein the selection strategy for random-access configuration is used by the first terminal device to select target random-access configuration according to AI algorithm input data.

16. The method of claim 15, wherein the AI control information further comprises optimization goal information, and an optimization goal indicated by the optimization goal information comprises at least one of: energy saving, latency reduction, data throughput enhancement, data bit error rate (BER) reduction, quality of service (QoS) level improvement, or service continuity enhancement.

17. The method of claim 15, wherein the AI control information further comprises AI algorithm input-data-type information, wherein the control method is applied to the random-access scenario, a data type indicated by the AI algorithm input-data-type information comprises at least one of:

geographical location information of the first terminal device;

a measurement result of a serving cell;

a measurement result of at least one neighboring cell;

an evaluation result of a random access channel (RACH) busy ratio;

an evaluation result of channel interference; or an RACH history report.

18. The method of claim 15, wherein when the control method is applied to the random-access scenario, the data type indicated by the AI algorithm output-data-type information further comprises at least one of:

desired random-access configuration;

an updated AI algorithm;

a modification strategy for an AI algorithm input parameter; or a modification strategy for an AI algorithm output parameter.

19. A terminal device, comprising:

a processor and a memory;

wherein the memory is configured to store a computer program, and the processor is configured to execute the computer program to cause the terminal device to:

receive artificial intelligence (AI) control information from a network device or a second terminal device, the AI control information comprising AI algorithm output-data-type information;

wherein when the terminal device operates in cell selection/re-selection scenario, a data type indicated by the AI algorithm output-data-type information comprises decision-making information for target cell determination during cell selection/re-selection, wherein the decision-making information for target cell determination is used by the terminal device to obtain characteristic information of a target cell according to AI algorithm input data; or wherein when the terminal device operates in random-access scenario, a data type indicated by the AI algorithm output-data-type information comprises a selection strategy for random-access configuration, wherein the selection strategy for random-access configuration is used by the terminal device to select target random-access configuration according to AI algorithm input data.

* * * * *